United States Patent

[11] 3,630,535

[72] Inventor Pierre E. Renoux
   Colombes, France
[21] Appl. No. 820,394
[22] Filed Apr. 30, 1969
[45] Patented Dec. 28, 1971
[73] Assignee Cri-Dan
   Paris, France
[32] Priority July 3, 1968
[33] France
[31] 157 609

[54] MACHINE TOOL CHUCK
   11 Claims, 4 Drawing Figs.
[52] U.S. Cl. ............................................. 279/15 J,
   279/1 L, 279/120
[51] Int. Cl. .......................................... B23b 31/16
[50] Field of Search ............................. 279/1 TE, 1
   L, 1 J, 120, 121, 122, 74, 75

[56] References Cited
   UNITED STATES PATENTS
2,854,239  9/1958  Lammens ..................... 279/1 J
2,794,648  6/1957  Sampson ...................... 279/1 J
2,852,265  9/1958  Van Dinen .................... 279/1 J
   FOREIGN PATENTS
1,032,061  6/1958  Germany ...................... 279/120

Primary Examiner—Andrew R. Juhasz
Assistant Examiner—James F. Coan
Attorney—Woodhams, Blanchard and Flynn ABSTRACT: A machine tool chuck comprising a chuck body having a plurality of clamping jaws slidably mounted thereon and connected to a compensating actuator mechanism which includes an annular member connected to the clamping jaws by intermediate lever means whereby axial displacement of the annular member causes radial displacement of the clamping jaws between open and closed positions. The annular member is radially floatably mounted on a collar which is concentric with and nonrotatably secured to the chuck body, the collar being slidable axially relative to the chuck body and being connected to a suitable power source. A combined centering and locking device coacts between the collar and the floatable annular member for permitting the floatable annular member to be automatically coaxially aligned with the collar and suitably locked in said coaxially aligned position for permitting use of the chuck with concentric clamping action. The centering mechanism, in a preferred embodiment, comprises a centering pin slidably mounted on the collar and having a conical portion adapted to be disposed into a conical recess formed in the annular member for automatically centering the annular member.

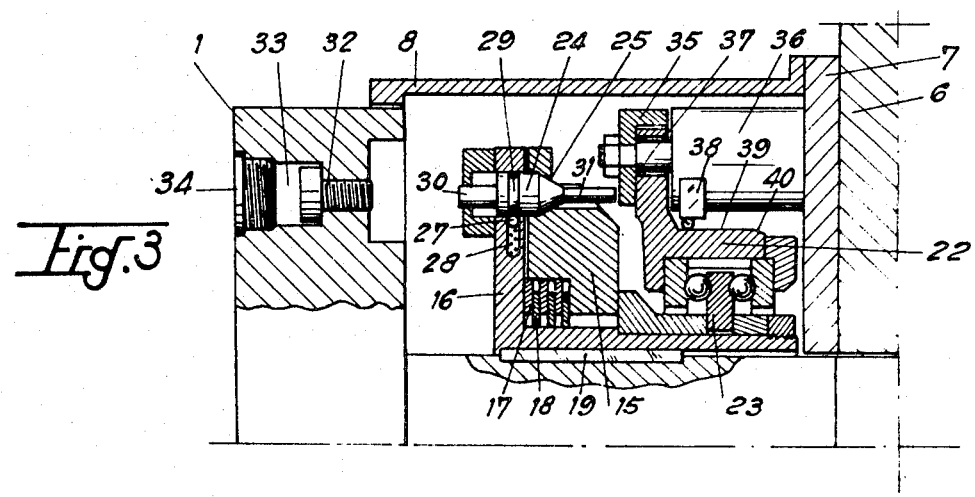
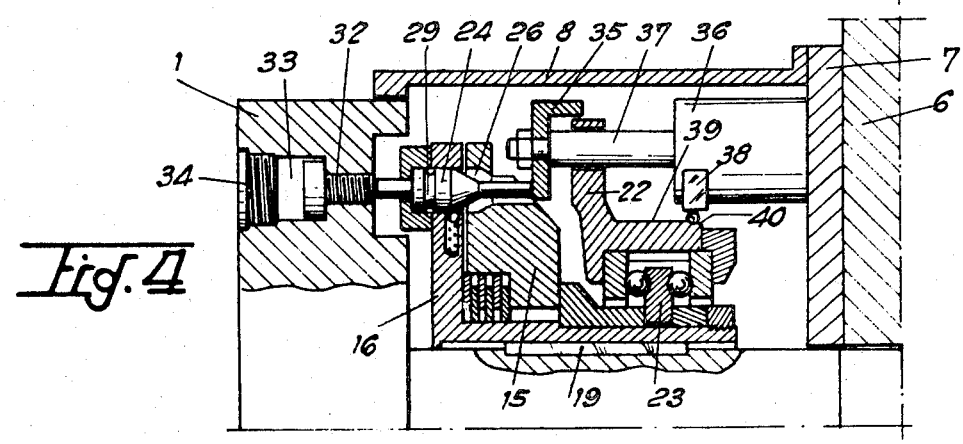
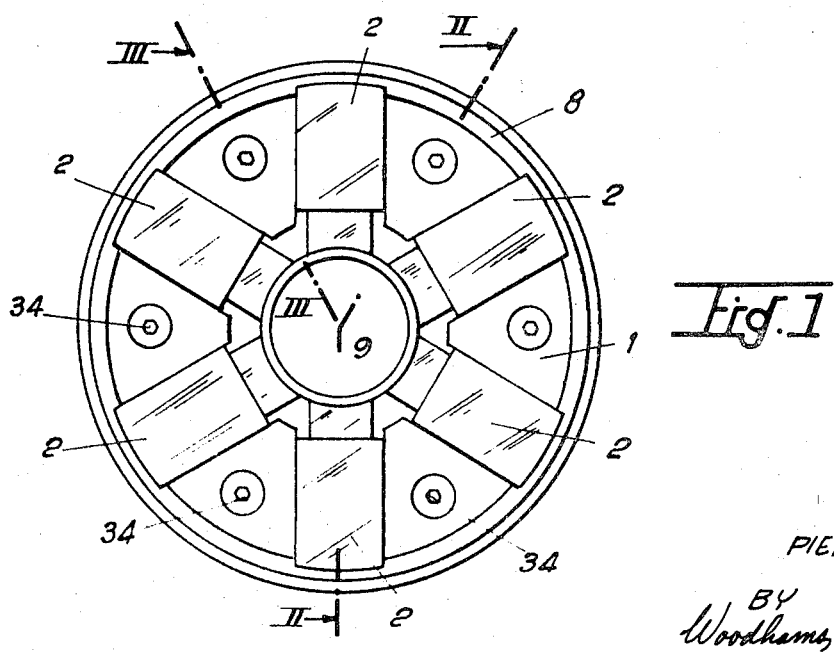

INVENTOR
PIERRE E. RENOUX

MACHINE TOOL CHUCK

The present invention relates to a machine tool chunk, especially for machine tools of the lathe type, comprising a chuck body in which is slidably mounted a set of clamping jaws actuated by an eccentricity compensation mechanism consisting of a floating annular member mounted on a collar which is capable of sliding longitudinally with respect to the chunk body under the action of control jacks, said annular member being provided with inclined ramps adapted to cooperate with levers for operating the jaws at the time of translational motion of the annular member.

IN machine tools of the lathe type, the chunk usually has three jaws and serves to secure the workpiece to the power spindle. Chunks of the compensation type are already in use for the purpose of driving a workpiece in rotation, the rotational axis of the workpiece being defined by means such as centers which are independent of the clamping jaws.

In another known type of chuck, some of the jaws which may be three in number, for example, are actuated by a mechanism designed to produce a clamping action which is concentric with the rotational axis of the spindle whilst different jaws which may also be three in number are actuated by another clamping mechanism which provides compensation for eccentricity.

However, in some applications and especially when machining tubes of substantial length which have to be engaged through the spindle of the machine, it can be an advantage to provide the possibility of clamping the workpiece by means of a chunk in which all the jaws are capable of providing either concentric clamping or compensation clamping in accordance with requirements. Although chunks of this type already exist, they are not as a rule very convenient in practice since the operation which is necessary in order to change from concentric clamping to compensation clamping or conversely always entails a time interval during which the machine tool is immobilized to no useful purpose. Moreover, in order to carry out this operation it is first necessary in the majority of cases to withdraw the workpiece from the spindle, which is not always desirable and further increases the outage time of the machine.

The present invention is primarily intended to overcome the above-mentioned disadvantages and is accordingly directed to a chuck of the above-mentioned type which is essentially characterized in that said chuck further comprises a locking device which can be remotely operated so that the floating device which can be remotely operated so that the floating annular member may be recentered and secured at will relative to the axis of the chuck and the clamping action of the chuck may thus be made concentric.

It can readily be understood that, by virtue of this arrangement, the operation which is necessary in order to change over from concentric clamping of the chuck to compensation clamping or conversely can be carried out virtually instantaneously and without any need to remove the workpiece, from the spindle, for example by depressing a simple electric selection contact. Thus, the operation of the machine tool is practically not interrupted.

As a preferable feature, the locking device is locked automatically each time the jaws open and is unlocked at will by means of the remote control system.

In this manner, the chunk is always in the concentric clamping condition at the outset and it is necessary to operate a pushbutton selector when eccentricity compensation clamping is required.

As an advantageous feature, the remote control of the locking device is carried out by means of some of the jaw-actuating jacks.

By virtue of this arrangement, it is not necessary to employ any source of auxiliary power in order to make a selection between concentric clamping and compensation clamping of the chuck, thereby reducing the cost price of the chuck to a considerable extent.

In a particular embodiment of the invention, the locking device comprises conical studs which are slidably mounted on the collar of the compensation mechanism and adapted to cooperate with corresponding conical recesses formed in the floating annular member, stops which are secured to the chuck body and adapted to cooperate with the studs at one end thereof in order to thrust said studs into said recesses at the time of translational motion of the collar which results in opening of the jaws, and a drive unit which can be remotely operated in order to thrust said studs away from said recesses when so required.

Preferably, the drive unit is constituted by one or a number of jaw-actuating jacks, the operating rods of the said jacks being secured to an annular disc so as to insure that the sliding collar is driven in translational motion by said jacks only in the direction which corresponds to clamping of the jaws whilst the operating rods of the other jacks are rigidly coupled to the collar for translational motion in both directions, said annular disc being adapted to cooperate with the opposite extremities of the studs in order to force said studs away from the recesses at the time of a relative movement of the disc with respect to the collar and to the floating annular member.

A chuck of this type can easily be produced at low cost and also provides high operational reliability.

Suitably, the stops which serve to carry out automatic recentering of the floating annular member each time the jaws open are capable of being withdrawn so that the chunk may thus be employed with compensation clamping over long periods without entailing the need to actuate the locking device every time. Premature wear of said device is thus prevented.

A better understanding of the invention will be obtained from the following description, reference being made to the accompanying drawings in which one exemplified embodiment is shown by way of nonlimitative example, and wherein:

FIG. 1 is a simplified front view of a machine tool chunk in accordance with the invention;

FIG. 3 is a fragmentary sectional view taken along line III—III of FIG. 1; and

FIG. 4 is a fragmentary sectional view which is similar to FIG. 3 and shows the chuck components in a different operating position.

Figure 2:
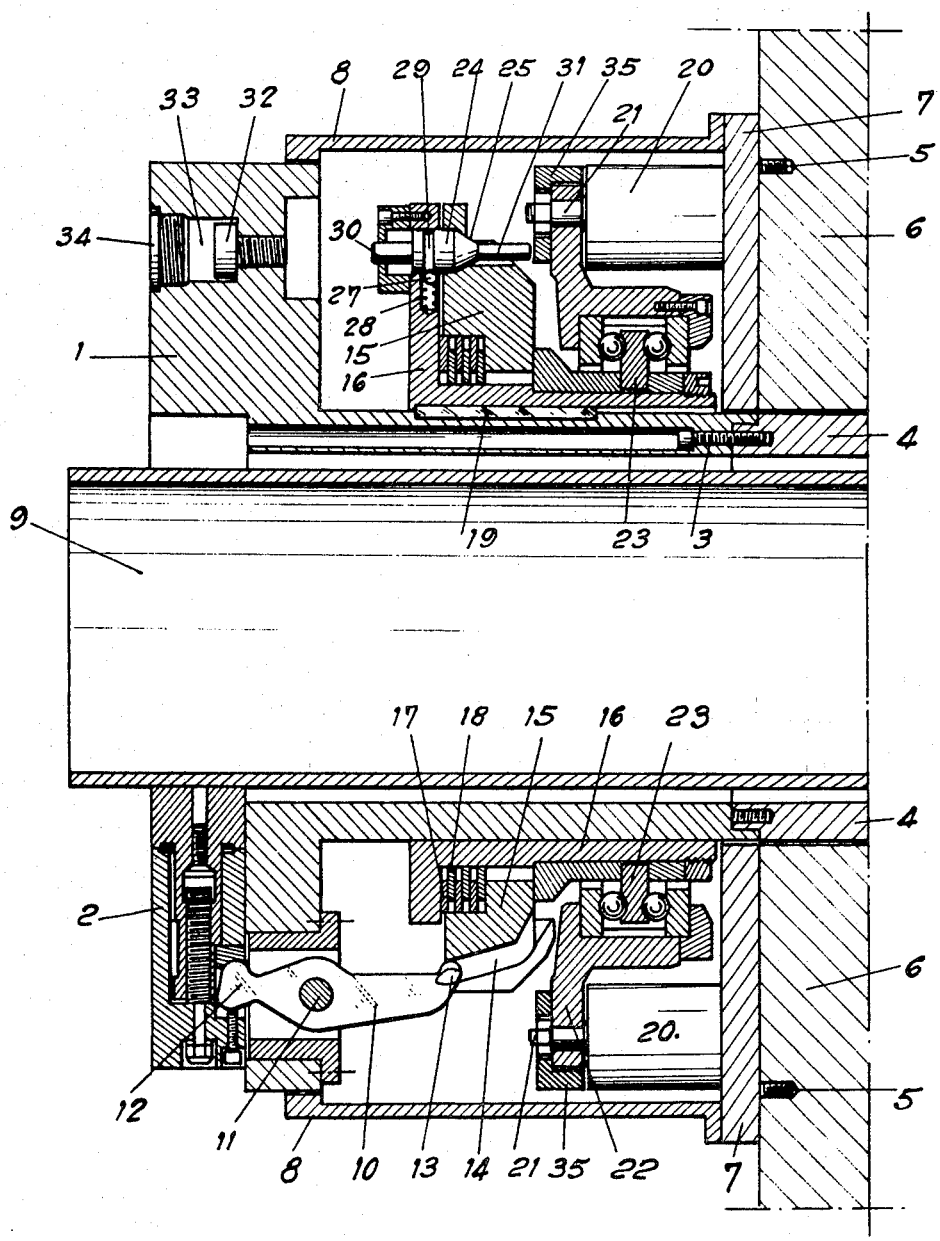
FIG. 2 is an axial sectional view taken along line II—II of FIG. 1.

The chuck which is shown in the figures is essentially constituted by a cylindrical chunk body 1 in which clamping jaws 2 are mounted to permit radial sliding motion. In the example of construction herein described, said jaws are six in number and are uniformly spaced at angular intervals of 60°.

The chuck body 1 is secured by means of screws 3 to the rotary spindle 4 of a machine tool of the lathe type. The stationary or nonrotating portion of the chuck is secured by means of screws 5 to the headstock 6 of said machine tool by means of an annular plate 7 which carries the protective chuck casing 8. There is also shown at 9 a workpiece in the form of a tube, the end of which is to be machined and which passes entirely through the spindle 4 along the rotational axis of this latter.

The clamping jaws 2 are operated by a compensating actuator mechanism of known type whereby opening or closure of said jaws can be carried out at will while making it possible within certain limits to compensate for geometrical defects of the clamped surface with respect to the centered surface of the part to be machined. This mechanism comprises levers 10 pivoted about pins 11 which are carried by the chuck body 1, each lever being adapted to actuate one of the jaws 2 by means of an extremity 12 in the form of a bearing knuckle which is adapted to cooperate with a corresponding recess formed in the jaw. The other end of each lever 10 is fitted with a runner wheel 13 in cooperating relation with inclined ramps 14 which are formed in a floating annular member 15. Said floating annular member 15 is mounted with a predetermined radial play on a sliding collar 16 by virtue of means which are described hereinafter.

Alternately arranged washers 17 and 18 are interposed between the annular member 15 and the collar 16. The washers 17 are centered within the annular member 15 without play while having a certain play with respect to the collar 16 whereas the washers 18 are centered on the collar 16 without play but have a certain play with respect to the annular member 15. The number of said washers 17 and 18 is determined as a function of the desired minimum clamping force of the chuck.

The collar 16 is capable of sliding axially over the chuck body 1 but is driven in rotation with this latter by means of one or a number of guide keys 19. The axial displacement of said collar 16 is produced by means of jacks such as the jack 20 which are preferably of the pressure-fluid type and mounted on the annular plate 7 which is rigidly fixed to the headstock 6 of the machine tool. The piston rods 21 of said jacks 20 are secured to an annular member 22 which is coupled to the collar 16 by means of a ball-thrust bearing 23 or any like rotary seal of suitable type such as a pad-thrust or roller-thrust bearing. It accordingly becomes apparent that, depending on whether the fluid pressure is applied on either one face of the pistons of the jacks 20 or on the other, the collar 16 is displaced axially either in one direction or in the other and therefore causes either the clamping of the jaws 2 against the tube 9 with compensation for eccentricity of this latter or the releasing of said jaws.

In accordance with the invention, the chuck further comprises a locking device whereby the annular member 15 is keyed radially with respect to the collar 16 whenever this is desired. This locking device is essentially constituted by studs 24 which are six in this example of construction and are slidably mounted on the collar 16. Each stud has a conical portion 25 which is capable of engaging in a corresponding conical recess 26 formed in the annular member 15 so that this latter may be recentered and locked in position with respect to the collar 16 as and when required.

The studs 24 are capable of longitudinal displacement with respect to the collar 16 between two end positions materialized by a detent ball 27 which is subjected to the action of a spring 28. Said ball 27 is applied either within a channel 29 of the stud which corresponds to locking of the annular member 15 or against the conical portion 25 which corresponds to unlocking of said annular member.

The studs 24 are also provided at each end with a pushrod as designated respectively by the references 30 and 31. Each pushrod 30 is associated with a stop which is rigidly fixed to the chuck body, said stop being constituted in this example by a detachable screw 32. The screws 32 are also accessible from the exterior through recesses 33 which are formed in the front face of the chuck body and which are normally sealed off by means of plugs 34.

The pushrods 31 are in turn adapted to cooperate with an annular member 35 which is disposed between the annular member 15 and the annular member 22, said member 55 being capable of axial displacement with respect to the chuck body 1 under the action of jacks such as the jack 36 so as to come into contact with the ends of said pushrods. The operating rods 37 of the jacks 36 are secured to the annular member 35 and mounted so as to permit free sliding motion of said rods through suitable recesses in the annular member 22. Thus, when the jack rods 37 move towards the left as shown in FIG. 4, only the annular member 35 is actuated whereas, when said operating rods move towards the right, the annular member 22 is also actuated. On the contrary, when the operating rods 21 of the jacks 20 move towards the left, both annular members 22 and 35 are driven at the same time whereas, in the other direction, only the member 22 is actuated.

The chuck in accordance with the invention is therefore provided with two types of jacks: jacks 20 having operating rods 21 which are secured to the annular member 22, and jacks having operating rods 37 which are secured to the annular member 35. In the example of construction herein described, there are three jacks of each type, namely a total of six, which are disposed alternately and at uniform angular intervals.

Provision is also made for a microswitch 38 so that the supply of fluid to the jacks can be reversed automatically. Said microswitch is mounted on a stationary portion of the chuck, for example on the body of one of the jacks 36 and can be actuated by means of a runner wheel against a horizontal bearing surface 39 of the annular member 22 which is provided at one end with a chamfered edge 40.

The chuck which has just been described operates as follows:

It will first be noted that, as each opening motion of the jaws 2 takes place, that is to say when the collar 16 and the annular member 15 carry out a movement of displacement from the position shown in FIG. 2 towards the left-hand side under the action of the jacks 20, the pushrods 30 of the studs 24 come into contact with the stops 32 at the end of the releasing action. The studs 24 are consequently displaced towards the right if they were not already in that position and automatically effect recentering as well as radial locking of the annular member 15 with respect to the collar 16 by virtue of the conical portion 25 which cooperates with the corresponding recess 26 of the annular member. It will also be noted that this operation can be carried out even when the chuck continues to rotate inasmuch as the studs 24 are rotationally coupled to the chuck body 1 which carries the stops 32. The annular member 15 of the chuck is thus always locked to the collar 16 at the outset and the studs 24 take up the position shown in FIG. 2 or FIG. 3 in which the balls 27 are applied within the channels 29.

If the six jacks 20 and 36 are now actuated simultaneously for the clamping operation, that is to say if said jacks are supplied with fluid so that the operating rods 21 and 37 withdraw into the interior of the jack bodies, the entire moving system 22-23-35-24-15-16-17-18 is actuated at the same time. The clamping of the jaws 2 against the tube 9 is accordingly concentric since the floating annular member 15 remains locked to collar 16 of the studs 24.

On the other hand, if the three jacks 20 are actuated solely for clamping action whilst the three jacks 36 remain supplied in the release condition, only the moving system 22-23-15-16-17-18 is actuated and the annular member 35 remains in its initial position. The pushrods 31 are therefore abuttingly applied against said annular member 35 and displace the studs 24 towards the left away from the recesses 26 of the annular member 15 until the balls 27 are applied against the conical portions 25 as illustrated in FIG. 4. The floating annular member 15 of the chuck is accordingly unlocked and has a certain radial play with respect to the collar 16. It will be noted that this operation is possible only when the chuck is stopped, which is practically always the case at the moment of clamping of the workpiece since the annular member 35 is secured against rotation with respect to the headstock 6 whereas the studs 24 rotate with the chuck body 1.

At the end of a predetermined travel of the annular member 22, the chamfered edge 40 of the bearing surface 39 of the said member comes into contact with the runner wheel of the microswitch 38, thereby causing the reversal of the fluid supply to the three jacks 36. The operating rods 37 of the said jacks accordingly draw back the annular member 35, then the annular member 22, and finally cooperate with the three jacks 20 so as to carry out effective clamping of the jaws 2 around the periphery of the tube 9.

Since the annular member 15 is unlocked, the clamping action just referred to is of the eccentricity-compensation type. In other words, the jaws 2 come into position in such a manner as to be adapted to the external surface of the tube 9 without applying any force other than a clamping force which is equalized between the different jaws. The friction forces generated by the axial thrust of the jacks between the surfaces of the washers 17 an 18 and the corresponding surfaces of the collar 16 and of the annular member 15 result in positional locking of said member 15 and in irreverablitly of the compensation motion.

By means of the chuck according to the invention, either a clamping action which is concentric with the axis of the spindle or a clamping action which provides compensation for eccentrictiy may accordingly be provided at will. Changeover from one to the other may be carried out automatically and practically instantaneously by any suitable means such as a simple two-position electric pushbutton selector which controls the operation of the jacks 20 and 36. Said selector can also consist of a relay which is incorporated in the sequence of an automatic machine.

The stops 32 can naturally be unscrewed by hand after removal of the plugs 34. Under these conditions the annular member 15 remains unlocked, with the result that the chuck accordingly operates continuously with eccentricity-compensation clamping without any need to carry out electric selection prior to each operation. This has the effect of preventing premature wear of the locking device when concentric clamping of the chuck is not required over a long period of service.

It will also be readily apparent that the embodiment of the invention as hereinabove described has been given solely by way of example without any limitation being implied and that any number of modifications may accordingly be contemplated without thereby departing from the scope of the invention.

What we claim is:

1. In combination, a machine tool chuck having a chuck body and a plurality of clamping jaws slidably mounted on said chuck body for radial movement relative to said chuck body between open and closed positions a driving member coaxially aligned with and nonrotatably interconnected to said chuck body, said driving member being mounted for axial movement relative to said chuck body, and compensating actuator means drivingly connected between said driving member and said clamping jaws for permitting movement of said jaws in response to axial movement of said driving member and for additionally permitting the radial position of said jaws to compensate for eccentricity of a workpiece, said compensating actuator means including an annular member mounted on said driving member for free radial floating movement relative thereto and intermediate link means drivingly connected between said floating annular member and said clamping jaws, the improvement comprising a centering mechanism coacting with said floating annular member for permitting said floating annular member to be repositioned in coaxial alignment with and radially secured relative to said chuck body to enable the clamping action of the tool chuck to be made concentric relative to the chuck body.

2. A chuck accordingly to claim 7, wherein said centering mechanism includes a centering pin mounted on one of said driving and floating members for sliding movement between first and second positions, said centering pin having a conical portion adapted to be disposed within a conical recess formed in the other of said driving and floating members when said centering pin is in said first position for causing said floating member to be aligned with said driving member, said centering pin when in said second position having the conical portion thereof substantially withdrawn from said conical recess for permitting free radial floating movement of said floating member.

3. A chuck according to claim 2, wherein said centering pin is slidably mounted on said driving member and said conical recess if formed in said floating member.

4. A chuck according to claim 3, further including spring-urged detent means mounted on said driving member and disposed for coaction with said centering pin for releasably resiliently locking said centering pin in either said first position or said second position.

5. A chuck according to claim 3, wherein said driving member and said floating member are axially movable as a unit between first and second axially spaced locations for causing said clamping jaws to be moved between open and closed positions, respectively, and further including stop means mounted on said chuck body and disposed for contacting said centering pin for causing said centering pin to be moved into said first position so as to automatically recenter said floating member whenever said driving member and said floating member are moved toward said first location.

6. A chuck according to claim 3, further including movable release means disposed for coaction with said centering pin for permitting movement of said centering pin from said first position to said second position to radially release said floating member from said driving member, said release means including a movable release member disposed for movement in a direction substantially parallel to the axis of said chuck body.

7. A chuck according to claim 6, wherein said driving member and said floating member are axially movable as a unit between first and second axially spaced locations for causing said clamping jaws to be moved between said open and closed positions, respectively, and further including stop means mounted on said chuck body and disposed for contacting said centering pin for causing said centering pin to be moved into said first position so as to automatically recenter said floating member whenever said driving member and said floating member are moved toward said first location.

8. A chuck according to claim 7, wherein a first power unit is connected to said driving member for causing axial movement thereof between said first and second locations, and wherein said release means includes a second power unit connected to said release member for causing axial movement thereof independently of said first power unit.

9. A chuck according to claim 8, wherein said release member is movable by said second power means between a released position spaced from and out of engagement with said centering pin and an engaged position wherein said release means engages said centering pin and moves same to said second position, said release member having a portion thereof disposed between said centering pin and said driving member and positioned within the path of movement of said driving member whereby said release member is movable relative to said driving member from said released position to said engaged position, movement of said release member by said second power means from said engaged position to said released position causing said portion to engage said driving member to cause movement of said driving member toward said first location wherein said clamping jaws are in the open position.

10. A chuck according to claim 1, further including means coacting with said centering mechanism for automatically actuating said centering mechanism and causing said floating member to be recentered whenever said clamping jaws are moved to the open position.

11. A chuck according to claim 1, further including actuator means selectively actuatable and disposed for selective coaction with said centering mechanism to cause said centering mechanism to be moved between a first position wherein said annular member and said chuck body are coaxially fixedly secured and a second position wherein said annular member is radially floatable relative to said chuck body, whereby said chuck can thus be utilized either concentrically or eccentrically relative to the longitudinal axis thereof.

* * * * *